(12) United States Patent
Chari et al.

(10) Patent No.: US 8,250,635 B2
(45) Date of Patent: Aug. 21, 2012

(54) ENABLING AUTHENTICATION OF OPENID USER WHEN REQUESTED IDENTITY PROVIDER IS UNAVAILABLE

(75) Inventors: Suresh N. Chari, Scarsdale, NY (US); Gang Chen, Syosset, NY (US); Todd Eric Kaplinger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1073 days.

(21) Appl. No.: 12/172,252

(22) Filed: Jul. 13, 2008

(65) Prior Publication Data

US 2010/0011421 A1   Jan. 14, 2010

(51) Int. Cl.
*G06F 7/04* (2006.01)

(52) U.S. Cl. .......................................................... 726/5

(58) Field of Classification Search .................. 726/5–8, 726/27, 28; 713/168, 183, 184
See application file for complete search history.

(56) References Cited

U.S. PATENT DOCUMENTS

| | | | |
|---|---|---|---|
| 7,784,092 B2* | 8/2010 | Pearson et al. ..................... | 726/8 |
| 2006/0053296 A1* | 3/2006 | Busboom et al. .............. | 713/182 |
| 2008/0133735 A1* | 6/2008 | Thayer et al. .................. | 709/223 |
| 2009/0214018 A1* | 8/2009 | Tsai .......................... | 379/220.01 |
| 2010/0132019 A1* | 5/2010 | Hardt .............................. | 726/6 |

OTHER PUBLICATIONS

Recordon, David et al. "OpenID 2.0: A Platform for User-Centric Identity Management", Nov. 2006, pp. 11-15.*
Wikipedia, the free encyclopedia, "Yadis," May 5, 2008, pp. 1-3.
http://www.openidenabled.com/vadis/creating-a-vadis-services-document, pp. 1-3.
D. Hardt et al., http://openid.net/specs/openid-attribute-exchange-1_0.html, "OpenID Attribute Exchange 1.0—Final," Dec. 5, 2007, pp. 1-12.

* cited by examiner

*Primary Examiner* — Beemnet Dada
(74) *Attorney, Agent, or Firm* — Robert A. Voigt, Jr.; Winstead, P.C.

(57) ABSTRACT

A method, system and computer program product for enabling authentication of an OpenID user when a requested identity provider is unavailable. A relying party receives a login request from the OpenID user, where the login request includes a username. The relying party reads a list of trusted identity providers that are associated with the received username and selects one of those identity providers. The relying party generating an OpenID identifier using an identification (e.g., Uniform Resource Locator) of the selected identity provider and the username. The relying party transmits an authentication request (request to authenticate the OpenID user) to the selected identity provider using the formed OpenID identifier. If the selected identity provider is unavailable, then the relying party selects another identity provider from the list of identity providers that are associated with the received username and repeats the above process.

10 Claims, 8 Drawing Sheets

ENABLING AUTHENTICATION OF OPENID USER WHEN REQUESTED IDENTITY PROVIDER IS UNAVAILABLE

TECHNICAL FIELD

The present invention relates to OpenID technology, and more particularly to enabling authentication of an OpenID user when the requested identity provider is unavailable.

BACKGROUND OF THE INVENTION

OpenID is a shared identity service, which allows Internet users to log on to many different web sites using a single digital identity, eliminating the need for a different user's name and password for each web site. OpenID is a decentralized, free and open standard that is distributed across the Internet and maintained by numerous organizations, including major sites, such as AOL™ and Yahoo™.

In an OpenID system, a user, commonly referred to as an "OpenID user," transmits an authorization request or a logon request to a web site the user wants to log on. The authorization request may include what is referred to as an "OpenID identifier." A web site that accepts OpenID is known as the "relying party," because it relies upon an "identity provider" for authentication. As stated above, the web site may receive an OpenID identifier from the OpenID user. The OpenID identifier may be a Uniform Resource Locator ("URL") of the identity provider with a username appended to it or it may be Extensible Resource Identifier ("XRI") i-name. I-names are human-friendly names, such as "John.doe," that are linked to the OpenID provider.

When an OpenID user logs into an OpenID web site, the script in the web page redirects the browser of the OpenID user to the identity provider identified in the OpenID identifier. Using a password or other method, the identity provider attempts to authenticate the user and informs the relying party of its success or failure.

However, if the identity provider is unavailable, then the OpenID user cannot be authenticated and hence cannot access the OpenID web site. That is, when the identity provider is unavailable, the OpenID web site will not be able to leverage the security authentication functionality of the requested identity provider. As a result, the OpenID user will not be authenticated and will not be able to access the OpenID web site.

BRIEF SUMMARY OF THE INVENTION

In one embodiment of the present invention, a method for enabling authentication of an OpenID user when a requested identity provider is unavailable comprises receiving a login request from the OpenID user, where the login request comprises a username. The method further comprises reading a list of identity providers associated with the username. Furthermore, the method comprises identifying a first available identity provider from the list of identity providers. Additionally, the method comprises generating a first OpenID identifier using an identification of the first identified identity provider and the username. Further, the method comprises transmitting a request to the first identified identity provider to authenticate the OpenID user using the first OpenID identifier.

In another embodiment of the present invention, a method for obtaining attribute information for an OpenID user during an authentication phase comprises receiving a login request from the OpenID user, where the login request comprises a username. The method further comprises determining user profile attributes to be requested from one or more identity providers. Furthermore, the method comprises reading a list of identity providers associated with the username. Additionally, the method comprises identifying a first available identity provider from the list of identity providers. Further, the method comprises generating a first OpenID identifier using an identification of the first identified identity provider and the username. Furthermore, the method comprises transmitting an authentication request to the first identified identity provider to authenticate the OpenID user using the formed OpenID identifier.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

The present invention comprises a method, system and computer program product for enabling authentication of an OpenID user when a requested identity provider is unavailable. In one embodiment of the present invention, the relying party receives a login request from the OpenID user, where the login request includes a username. During the association phase, the relying party reads a list of trusted identity providers that are associated with the received username and selects one of those identity providers. Further, during the association phase, the relying party generates an OpenID identifier using an identification (e.g., Uniform Resource Locator) of the selected identity provider and the username. The relying party transmits an authentication request (request to authenticate the OpenID user) to the selected identity provider using the formed OpenID identifier. If the selected identity provider is unavailable, then the relying party selects another identity provider from the list of identity providers that are associated with the received username and repeats the above process. By having a list of trusted identity providers associated with the username of the OpenID user, the relying party is able to contact other trusted identity providers to authenticate the OpenID user when an identity provider is unavailable to authenticate the OpenID user.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
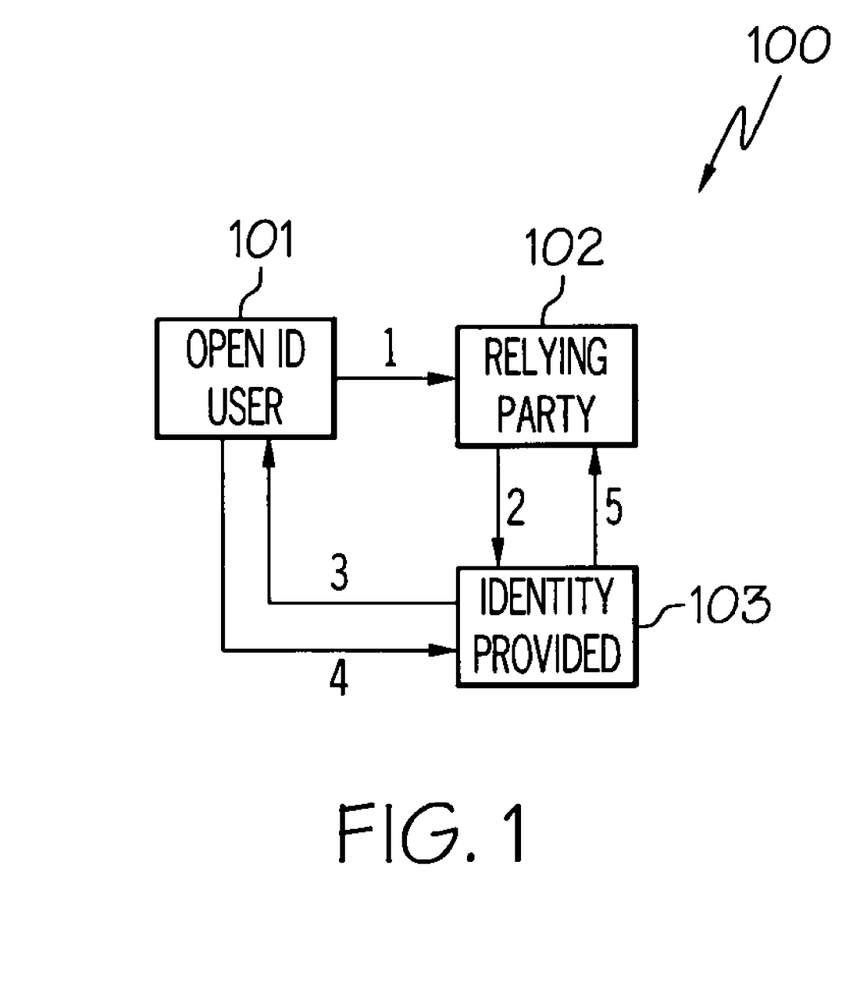
FIG. 1 illustrates an OpenID system in accordance with an embodiment of the present invention.

FIG. 1—OpenID System

FIG. 1 illustrates an embodiment of the present invention of an OpenID system 100. OpenID system includes one or more users 101, commonly referred to as "OpenID users." OpenID user 101 transmits a login request (indicated by the number "1" above the arrow from OpenID user 101 to relying party 102) to a web site 102 the user wants to log on. Web site 102 is commonly referred to as the "relying party." Relying party 102 relies upon an identity provider 103 to authenticate OpenID user 101. Relying party 102 transmits a request (indicated by the number "2" above the arrow from relying party 102 to identity provider 103) to authenticate OpenID user 101. In one embodiment, the request may be in the form of a Uniform Resource Locator ("URL"), such as the URL of identity provider 103, appended with the username of OpenID user 101. Alternatively, the request may be in the form of an Extensible Resource Identifier ("XRI") i-name.

Identity provider 103 may then transmit a request to OpenID user 101 (indicated by the number "3" above the arrow from identity provider 103 to OpenID user 101) and request a password or other method as a means for authenticating OpenID user 101. OpenID user 101 transmits its response (indicated by the number "4" above the arrow from OpenID user 101 to identity provider 103) to identity provider 103 which then indicates a pass or failure (indicated by the number "5" above the arrow from identity provider 103 to relying party 102) to relying party 102. That is, identity party 103 indicates to relying party 102 whether OpenID user 101 is authenticated or not based on the response from OpenID user 101.

OpenID system 100 may include any number of OpenID users 101, relying parties 102 and identity providers 103. Relying party 102 may be configured to attempt to authenticate OpenID user 101 using multiple identity providers 103 as discussed further below in connection with FIGS. 3A-B. Further, relying party 102 may be configured to obtain profile attributes of OpenID user 101 from one or more identity providers 103 as discussed further below in connection with FIGS. 4A-B and 5A-B. FIG. 1 is illustrative of OpenID system 100 and OpenID system 100 is not to be limited in scope to any one particular embodiment.

As discussed in the Background section, if the identity provider is unavailable, then the OpenID user cannot be authenticated and hence cannot access the OpenID web site. That is, when the identity provider is unavailable, the OpenID web site will not be able to leverage the security authentication functionality of the requested identity provider. As a result, the OpenID user will not be authenticated and will not be able to access the OpenID web site.

Figure 2:
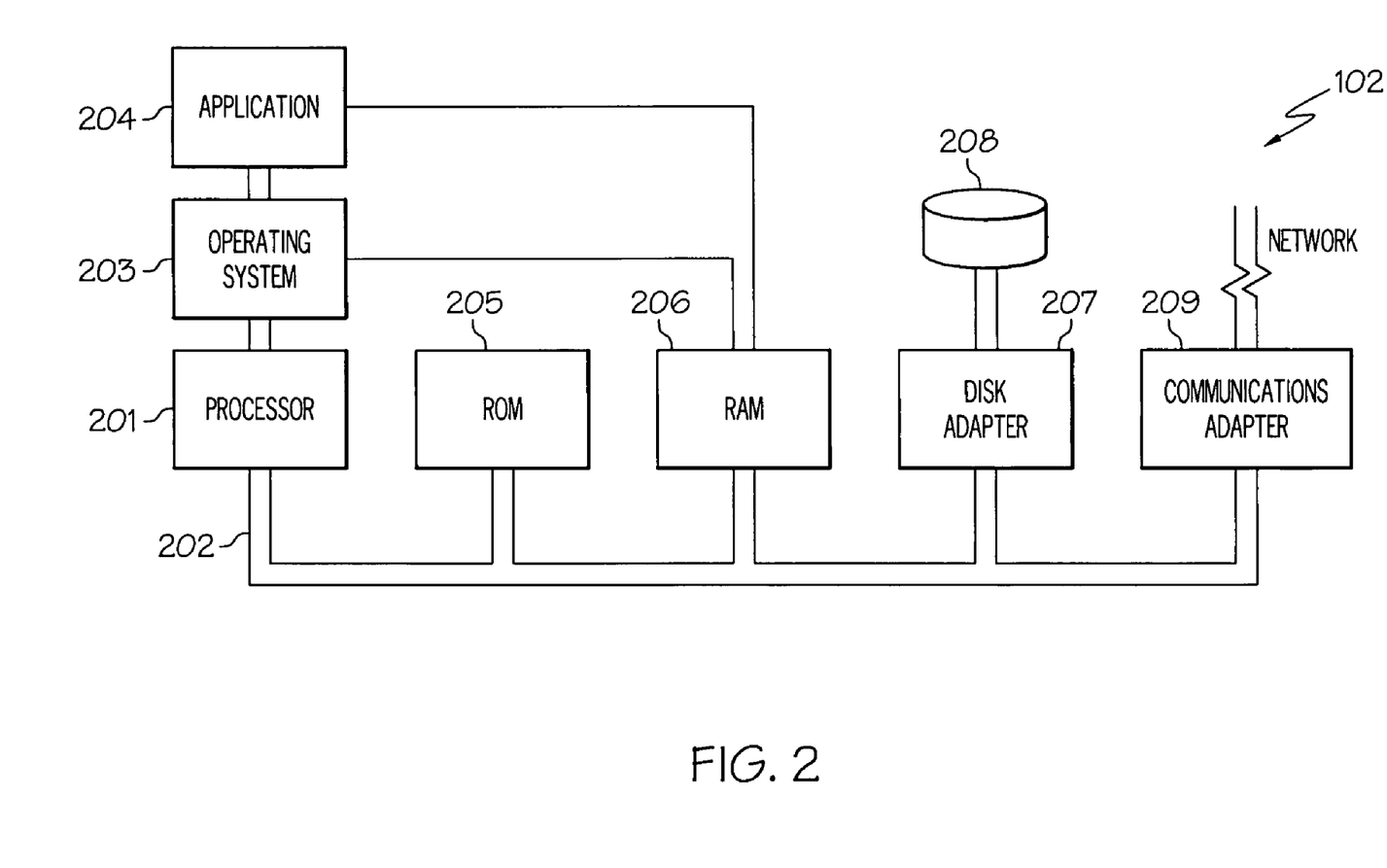
FIG. 2 is a hardware configuration of a relying party configured in accordance with an embodiment of the present invention.
Figure 3A:
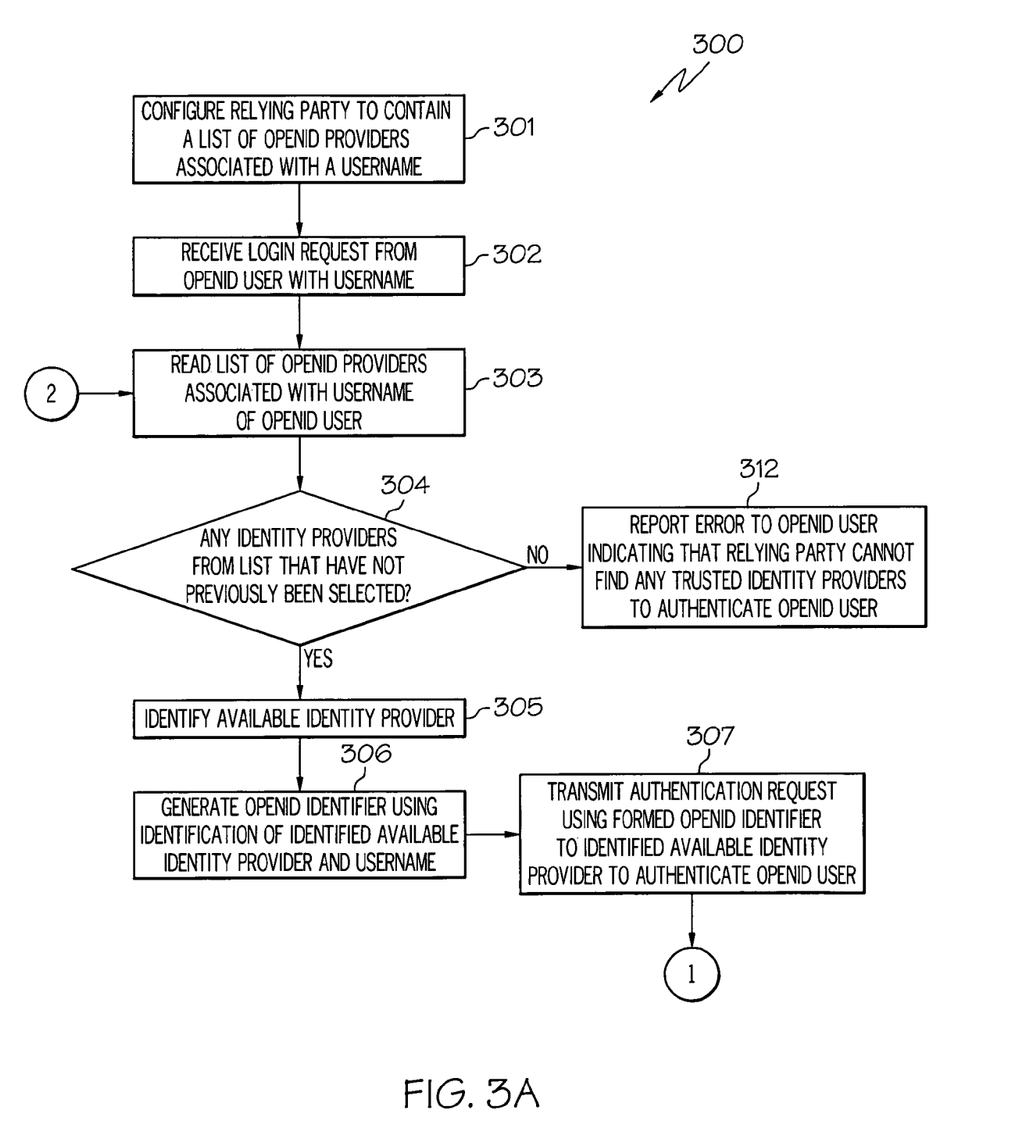
FIGS. 3A-B are a flowchart of a method for enabling authentication of an OpenID user when a requested identity provider is unavailable in accordance with an embodiment of the present invention.
Figure 3B:
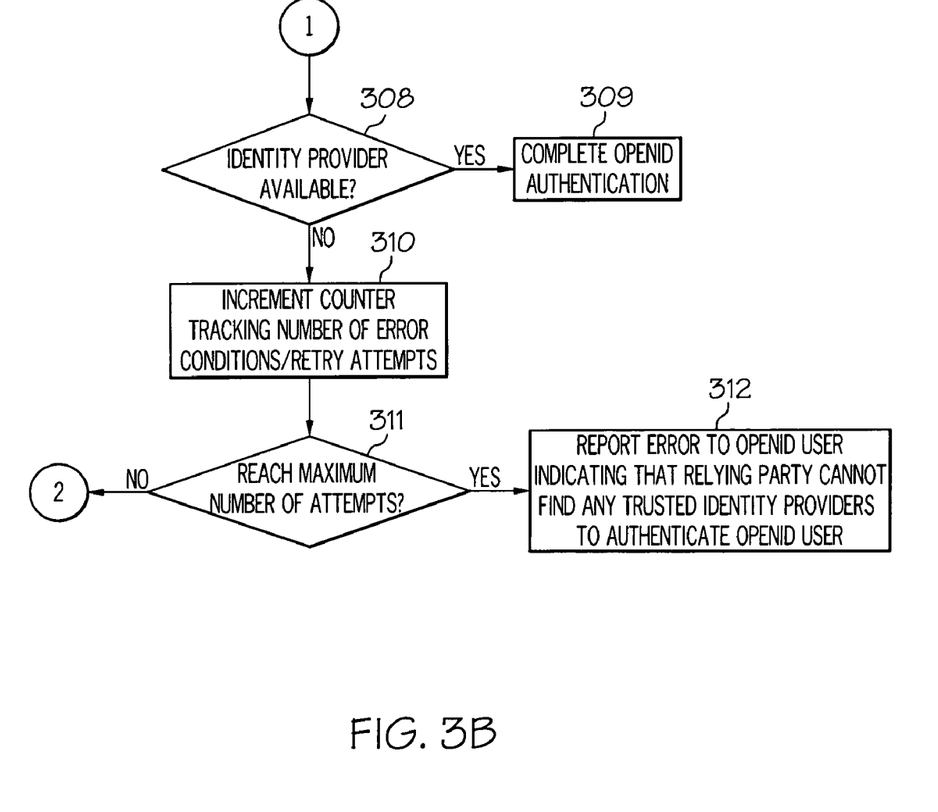

The OpenID user may be able to be authenticated when the identity provider, as specified in the OpenID user's OpenID identifier, is unavailable using the principles of the present invention as discussed below in connection with FIGS. 2 and 3A-B. FIG. 2 is an embodiment of the hardware configuration of relying party 102 which includes a software component used in the process for attempting to authenticate the OpenID user when the identity provider, as specified in the OpenID user's OpenID identifier, is unavailable. FIGS. 3A-B are a flowchart of a method for enabling authentication of an OpenID user when a requested identity provider is unavailable.

A description of a hardware configuration of relying party 102 is provided below in connection with FIG. 2.

FIG. 2—Hardware Configuration of Relying Party

FIG. 2 illustrates an embodiment of a hardware configuration of relying party 102 (FIG. 1) which is representative of a hardware environment for practicing the present invention. Relying party 102 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for enabling authentication of an OpenID user when a requested identity provider is unavailable as discussed further below in association with FIGS. 3A-B. Application 204 may further include a program for obtaining attribute information for an OpenID user during an authentication phase as discussed further below in association with FIGS. 4A-B and 5A-B.

Referring to FIG. 2, read-only memory ("ROM") 205 may be coupled to system bus 202 and include a basic input/output system ("BIOS") that controls certain basic functions of relying party 102. Random access memory ("RAM") 206 and disk adapter 207 may also be coupled to system bus 202. It should be noted that software components including operating system 203 and application 204 may be loaded into RAM 206, which may be relying party's 102 main memory for execution. Disk adapter 207 may be an integrated drive electronics ("IDE") adapter that communicates with a disk unit 208, e.g., disk drive. It is noted that the program for enabling authentication of an OpenID user when a requested identity provider is unavailable, as discussed further below in association with FIGS. 3A-B, may reside in disk unit 208 or in application 204. Further, the program for obtaining attribute information for an OpenID user during an authentication phase, as discussed further below in association with FIGS. 4A-B and 5A-B, may reside in disk unit 208 or in application 204.

Referring again to FIG. 2, relying party 102 may further include a communications adapter 209 coupled to bus 202. Communications adapter 209 may interconnect bus 202 with an outside network (not shown) thereby allowing relying party 102 to communicate with OpenID user 101, identity provider 103 and other similar devices.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

A discussion of an embodiment for enabling authentication of an OpenID user when a requested identity provider is unavailable is provided below in connection with FIGS. 3A-B.

FIGS. 3A-B—Method for Enabling Authentication of OpenID User when Requested Identity Provider is Unavailable FIG. 3 is a flowchart of a method 300 for enabling authentication of OpenID user 101 (FIG. 1) when the requested identity provider 103 (FIG. 1) is unavailable in accordance with an embodiment of the present invention.

Referring to FIG. 3A, in conjunction with FIGS. 1 and 2, in step 301, relying party 102 is configured to contain a list of OpenID providers 103 trusted by relying party 102 that are to be associated with a particular username. For example, a particular OpenID user 101 may have the username (e.g., john.doe) which can be associated with a list of OpenID providers 103 who relying party 102 trusts to authenticate OpenID user 101. In one embodiment, the list of OpenID providers 103 may be stored in memory, such as RAM 206, or on a permanent storage medium, such as disk 208, of relying party 102. In one embodiment, the list of OpenID providers 103 contains an identification for each OpenID provider 103, such as a URL for each OpenID provider 103.

In step 302, relying party 102 receives a login request from OpenID user 101 where the login request includes the username of OpenID user 101.

In step 303, relying party 102 reads the list of identity providers 103 associated with the received username of OpenID user 101.

In step 304, relying party 102 makes a determination as to whether there are any identity providers 103 from the list that have not previously been selected. After relying party 102 receives the login request and reads the list of identity providers 103 associated with the username of OpenID user 101, relying party 102 may select the first identity provider 103 from the list. As will be discussed further below, if that identity provider 103 is unavailable, relying party 102 may select the next available identity provider 103 from the list.

If there is an identity provider 103 that has not previously been selected from the list, then, in step 305, relying party 102 identifies an available identity provider 103 associated with the username of OpenID user 101.

In step 306, relying party 102 generates the OpenID identifier using the username and the identification (e.g., URL) of the identified available identity provider 103. For example, if the username of OpenID user 101 was "someuser" and the identification of the identified identity provider 103 was "http://someotherprovider.com," then relying party 102 may generate the OpenID identifier by appending the username with the identification of the identified available identity provider to form "http://someuser.someotherprovider.com." In another example, relying party 102 may use an algorithm to call a function to perform a calculation to generate the OpenID identifier. For instance, if the username of OpenID user 101 was "someuser", the identification of the identified identity provider 103 was "http://www.customidprovider.com?user=", and the algorithm reverses the string name of the username, then the OpenID identifier would be "http://www.customidprovider.com?user=resuemos." The OpenID identifier may also be in the format of an XRI i-name. In the example of using an XRI i-name, each trusted identity provider 103 in the list of trusted identity providers may be identified with a particular i-name. Steps 303-306 may be said to occur during a phase, referred to herein as the "association phase."

In step 307, relying party 102 transmits an authentication request, using the OpenID identifier formed in step 306, to the identified available identity provider 103 to authenticate OpenID user 101. The OpenID identifier in the authentication request identifies identity provider 103 who is requested to authenticate OpenID user 101.

Referring to FIG. 3B, in conjunction with FIGS. 1-2, in step 308, relying party 102 determines whether the identity provider 103 requested to authenticate OpenID user 101 is available. If the requested identity provider 103 is available to authenticate OpenID user 101, then, in step 309, the requested identity provider 103 completes the OpenID authentication to determine whether OpenID user 101 is an authorized user to access relying party 102.

If, however, the requested identity provider 103 is not available, then, in step 310, a counter is incremented to track the number of error conditions or retry attempts in attempting to locate a trusted identity provider 103 to authenticate OpenID user 101.

In step 311, relying party 102 determines whether relying party 102 has reached a maximum number of attempts in attempting to locate a trusted identity provider 103 to authenticate OpenID user 101. In one embodiment, relying party 102 determines if it reached a maximum number of attempts by determining if the count in the counter exceeds a threshold, which indicates the maximum number of attempts.

If the maximum number of attempts has been reached, then, in step 312, relying party 102 reports an error to the OpenID user 101 indicating that relying party 102 cannot find any trusted identity providers 103 to authenticate OpenID user 101.

Returning to FIG. 3A, if, however, the maximum number of attempts has not been reached, then, in step 303, relying party 102 reads the list of identity providers 103 associated with the received username of OpenID user 101. Relying party 102 may then determine, in step 304, if there are other identity providers 103 that have not previously been selected. If there are other identity providers 103 that have not been selected, then relying party 102 repeats the process in steps 305-308 to determine if that identity provider 103 is available. By having a list of trusted identity providers 103 associated with a username of OpenID user 101, relying party 102 is able to contact other trusted identity providers 103 to authenticate OpenID user 101 when an identity provider 103 is unavailable to authenticate OpenID user 101.

Referring to step 304, if there are no more available identity providers from the list that have not previously been selected and none of the previously selected identity providers has been available, then, in step 312, relying party 102 reports an error to the OpenID user 101 indicating that relying party 102 cannot find any trusted identity providers 103 to authenticate OpenID user 101.

Method 300 may include other and/or additional steps that, for clarity, are not depicted. Further, method 300 may be executed in a different order presented and that the order presented in the discussion of FIGS. 3A-B is illustrative. Additionally, certain steps in method 300 may be executed in a substantially simultaneous manner or may be omitted.

In addition to addressing the issue of when an identity provider is unavailable, the principles of the present invention address the issue of when OpenID user 101 may have created multiple profiles with multiple identity providers 103 where each profile may contain different information. "Information," as used herein, may refer to user attribute information (e.g., home address, e-mail address, favorite color) that is stored on a profile maintained by identify provider 103. Relying party 102 may desire particular user attribute information which may be contained in profiles maintained by particular identity providers 103. Further, portions of the desired user attribute information may be contained in various profiles maintained by particular identity providers 103.

Relying party 102 may be configured to attempt to select a trusted identity provider 103 that is not only available to authenticate OpenID user 101 but also one that is able to provide all of the user attributes requested by relying party 102 as discussed below in connection with FIGS. 4A-B. Alternatively, in addition to using the process as described in FIGS. 3A-B, relying party 102 may be configured to obtain as many of the desired user attributes from each available identity provider 103 until relying party 102 has obtained all of the desired user attributes as discussed below in connection with FIGS. 5A-B.

Figure 4A:
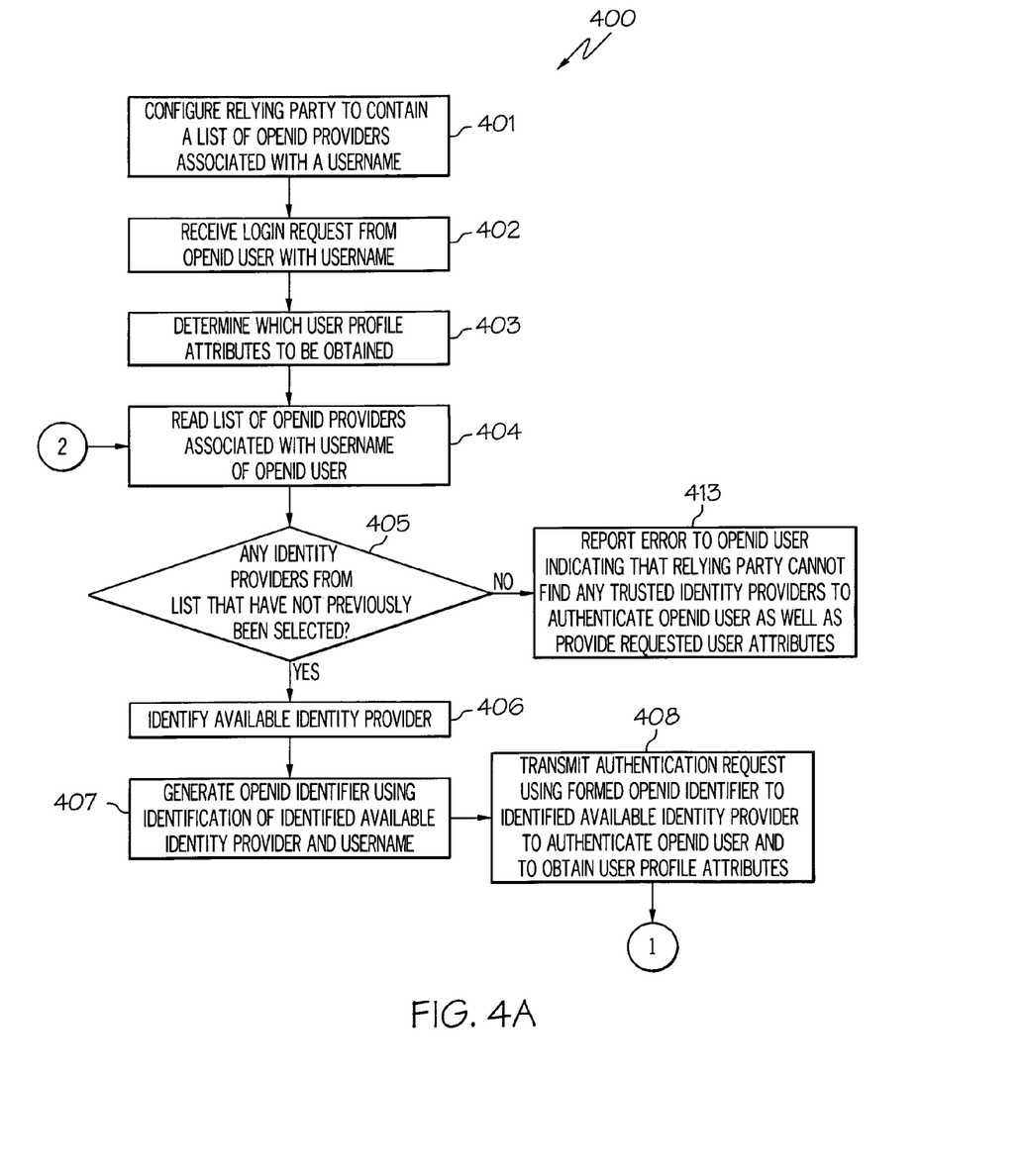
FIGS. 4A-B are a flowchart of a method for obtaining attribute information for an OpenID user during an authentication phase in accordance with an embodiment of the present invention.
Figure 4B:
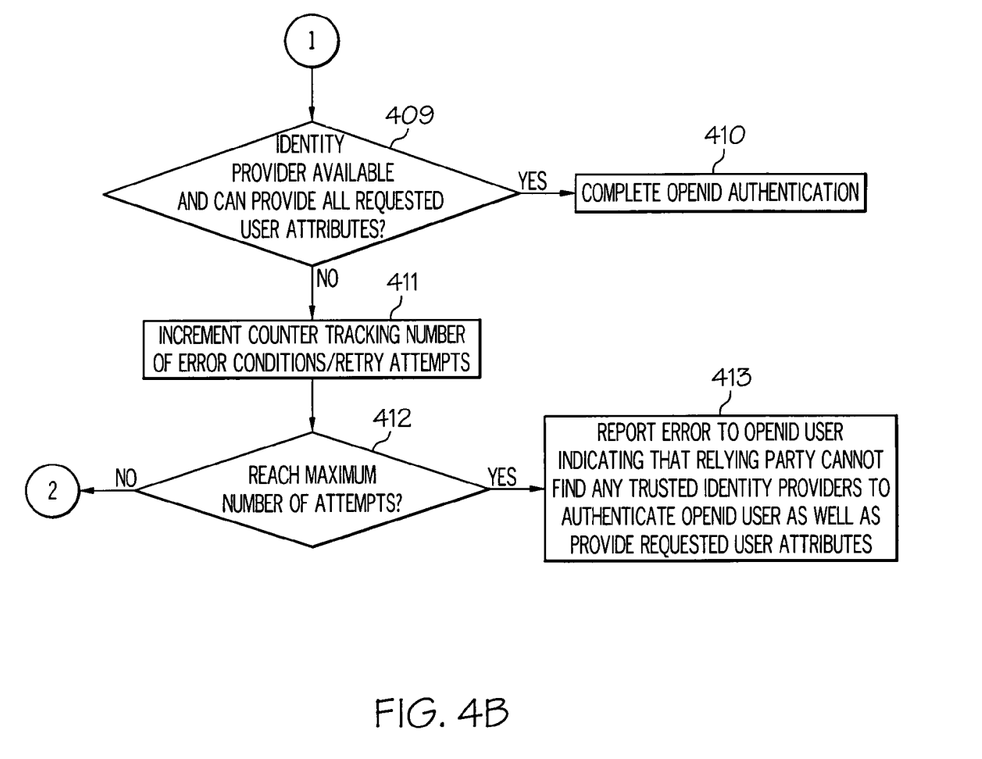

FIGS. 4A-B—Method for Obtaining Attribute Information for an OpenID User During an Authentication Phase FIGS. 4A-B are a flowchart of a method 400 for obtaining attribute information for OpenID user 101 (FIG. 1) during an authentication phase in accordance with an embodiment of the present invention.

Referring to FIG. 4A, in conjunction with FIGS. 1-2, in step 401, relying party 102 is configured to contain a list of OpenID providers 103 trusted by relying party 102 that are to be associated with a particular username. In one embodiment, the list of OpenID providers 103 may be stored in memory, such as RAM 206, or on a permanent storage medium, such as disk 208, of relying party 102. In one embodiment, the list of OpenID providers 103 contains an identification for each OpenID provider 103, such as a URL for each OpenID provider 103.

In step 402, relying party 102 receives a login request from OpenID user 101 where the login request includes the username of OpenID user 101.

In step 403, relying party 102 determines which user profile attributes (e.g., home address, home phone number, age) are to be obtained.

In step 404, relying party 102 reads the list of identity providers 103 associated with the received username of OpenID user 101.

In step 405, relying party 102 makes a determination as to whether there are any identity providers 103 from the list that have not previously been selected. After relying party 102 receives the login request and reads the list of identity providers 103 associated with the username of OpenID user 101, relying party 102 may select the first identity provider 103 from the list. As will be discussed further below, if that identity provider 103 is unavailable or if that identity provider 103 cannot provide all of the requested user attributes, then relying party 102 may select the next available identity provider 103 from the list.

If there is an identity provider 103 that has not previously been selected from the list, then, in step 406, relying party 102 identifies an available identity provider 103 associated with the username of OpenID user 101.

In step 407, relying party 102 generates the OpenID identifier using the username and the identification (e.g., URL) of the identified available identity provider 103. For example, if the username of OpenID user 101 was "someuser" and the identification of the identified identity provider 103 was "http://someotherprovider.com," then relying party 102 may generate the OpenID identifier by appending the username with the identification of the identified available identity provider to form "http://someuser.someotherprovider.com." In another example, relying party 102 may use an algorithm to call a function to perform a calculation to generate the OpenID identifier. For instance, if the username of OpenID user 101 was "someuser", the identification of the identified identity provider 103 was "http://www.customidprovider.com?user=", and die algorithm reverses the string name of the username, then the OpenID identifier would be "http://www.customidprovider.com?user=resuemos." The OpenID identifier may also be in the format of an XRI i-name. In the example of using an XRI i-name, each trusted identity provider 103 in the list of trusted identity providers may be identified with a particular i-name.

In step 408, relying party 102 transmits an authentication request, using the OpenID identifier formed in step 407, to the identified available identity provider 103 to authenticate OpenID user 101. The OpenID identifier in the authentication request identifies identity provider 103 who is requested to authenticate OpenID user 101. The authentication request further includes a request to receive the user profile attributes determined in step 403. In one embodiment, the additional request to receive the user profile attributes may be implemented using OpenID Attribute Exchange, which is a service extension for exchanging identity information.

Referring to FIG. 4B, in conjunction with FIGS. 1-2, in step 409, relying party 102 determines whether the identity provider 103 requested to authenticate OpenID user 101 is available and can provide all of the requested user profile attributes. If the requested identity provider 103 is available to authenticate OpenID user 101 and can provide all of the requested user profile attributes, then, in step 410, the requested identity provider 103 completes the OpenID authentication to determine whether OpenID user 101 is an authorized user to access relying party 102.

If, however, the requested identity provider 103 is not available or cannot provide all of the requested user attributes, then, in step 411, a counter is incremented to track the number of error conditions or retry attempts in attempting to locate a trusted identity provider 103 to authenticate OpenID user 101.

In step 412, relying party 102 determines whether relying party 102 has reached a maximum number of attempts in attempting to locate a trusted identity provider 103 to authenticate OpenID user 101 as well as to provide all of the requested user profile attributes. In one embodiment, relying party 102 determines if it reached a maximum number of attempts by determining if the count in the counter exceeds a threshold, which indicates the maximum number of attempts.

If the maximum number of attempts has been reached, then, in step 413, relying party 102 reports an error to the OpenID user 101 indicating that relying party 102 cannot find any trusted identity providers 103 to authenticate OpenID user 101 which can provide all of the requested user attributes.

Returning to FIG. 4A, if, however, the maximum number of attempts has not been reached, then, in step 404, relying party 102 reads the list of identity providers 103 associated with the received username of OpenID user 101. Relying party 102 may then determine, in step 405, if there are other identity providers 103 that have not previously been selected. If there are other identity providers 103 that have not been selected, then relying party 102 repeats the process in steps 406-409 to determine if that identity provider 103 is available and can provide all of the requested user attributes. By having a list of trusted identity providers 103 associated with a username of OpenID user 101, relying party 102 is able to contact other trusted identity providers 103 to authenticate OpenID user 101 and obtain the desired user attributes when an identity provider 103 is unavailable to authenticate OpenID user 101 or when an identity provider 103 cannot provide all of the desired user attributes.

Referring to step 405, if there are no more available identity providers from the list that have not previously been selected and none of the previously selected identity providers has been available and can provide all of the requested user attributes, then, in step 413, relying party 102 reports an error to the OpenID user 101 indicating that relying party 102 cannot find any trusted identity providers 103 to authenticate OpenID user 101 which can provide all of the requested user attributes.

Method 400 may include other and/or additional steps that, for clarity, are not depicted. Further, method 400 may be executed in a different order presented and that the order presented in the discussion of FIGS. 4A-B is illustrative. Additionally, certain steps in method 400 may be executed in a substantially simultaneous manner or may be omitted.

In an alternative embodiment to method 400, relying party 102 may be configured to obtain as many of the desired user attributes from each available identity provider 103 until relying party 102 has obtained all of the desired user attributes as discussed below in connection with FIGS. 5A-B. Method 500 of FIGS. 5A-B may be implemented separately from method 300 of FIGS. 3A-B as described below. Method 500 may be implemented when identity provider 103 that is used to authenticate OpenID user 101 does not contain all of relying party's 102 desired user profile attributes of OpenID user 101. Relying party 102 may then attempt to contact other identity providers 103 to obtain those desired profile attributes not possessed by identity provider 103 used to authenticate OpenID user 101.

Figure 5A:
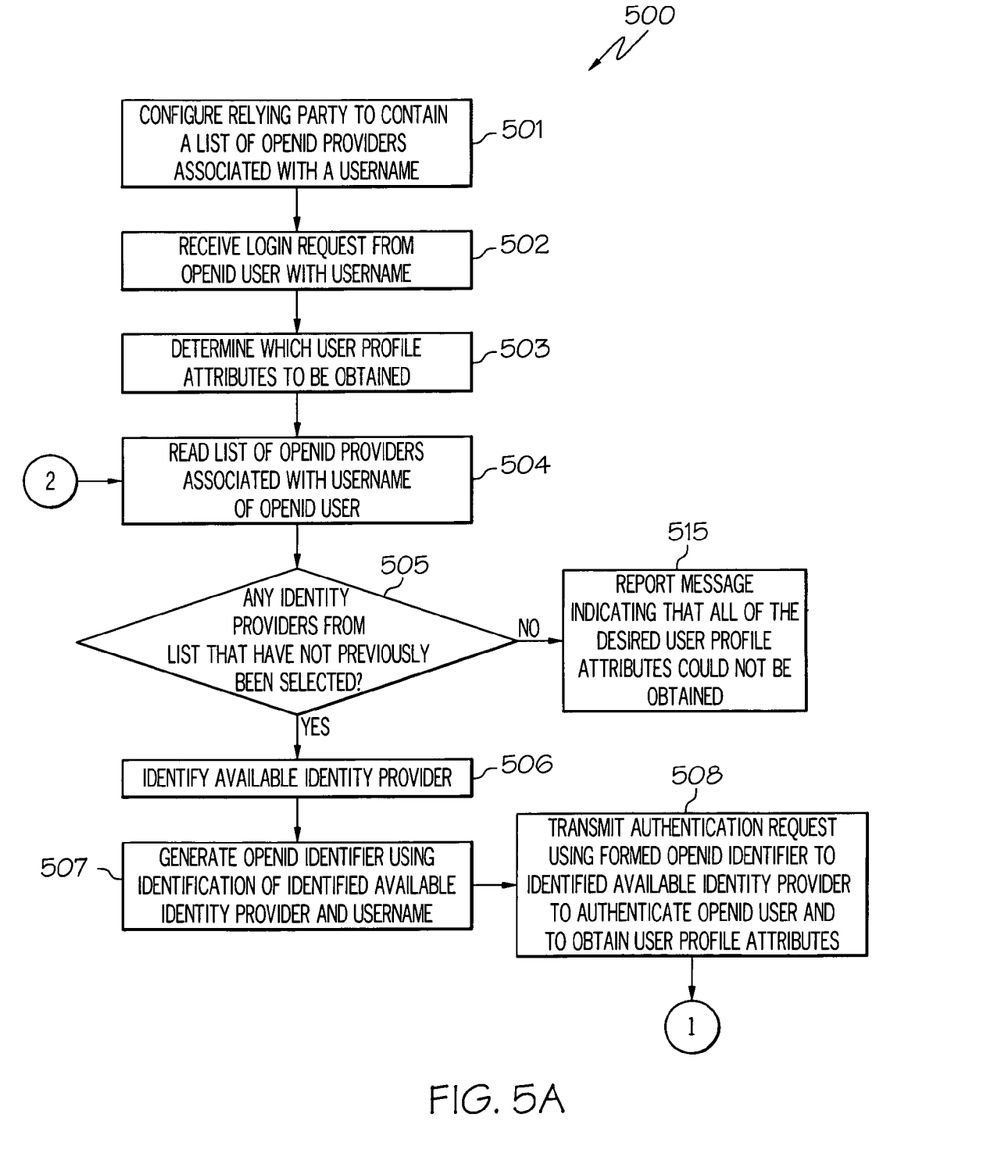
FIGS. 5A-B are a flowchart of an alternative method for obtaining attribute information for an OpenID user during an authentication phase in accordance with an embodiment of the present invention
Figure 5B:
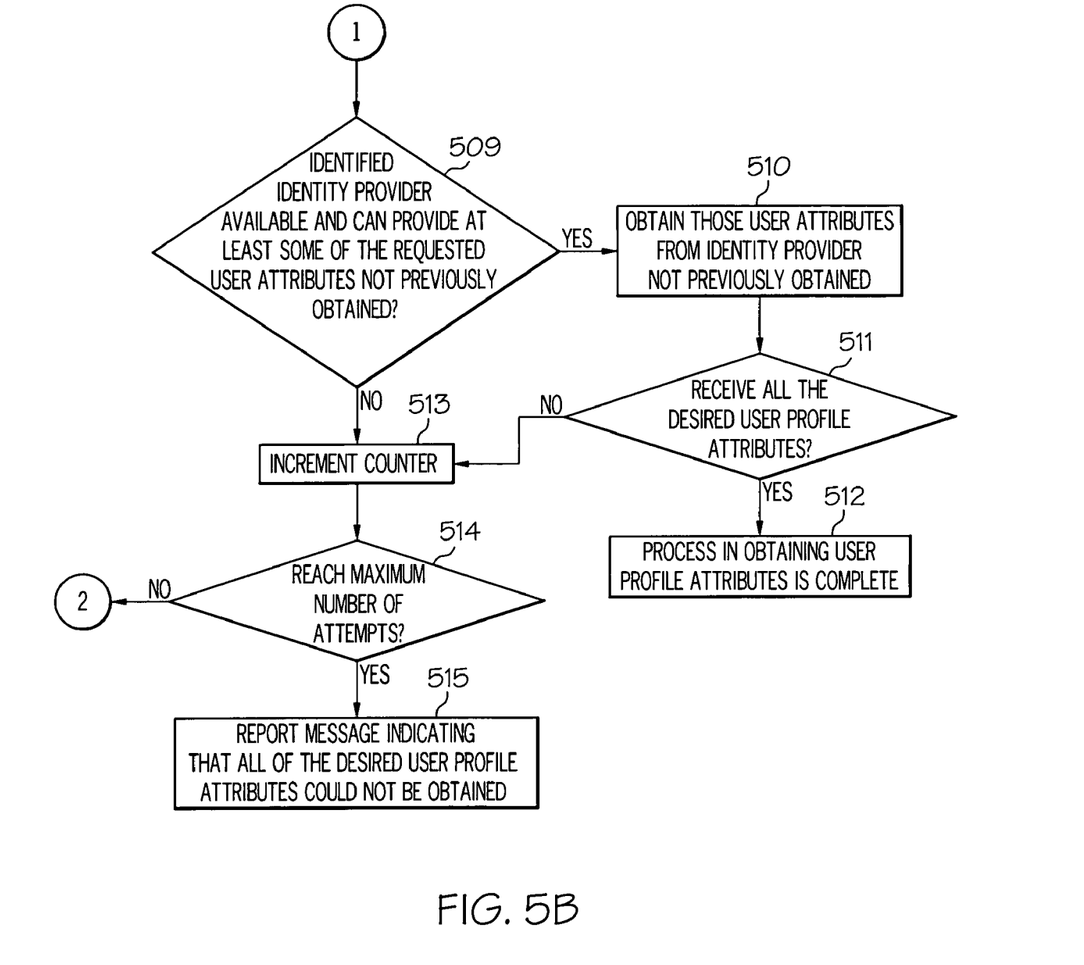

FIGS. 5A-B—Alternative Method for Obtaining Attribute Information for an Open ID User During an Authentication Phase FIGS. 5A-B are a flowchart of an alternative method 500 for obtaining attribute information for OpenID user 101 (FIG. 1) during an authentication phase in accordance with an embodiment of the present invention.

Referring to FIG. 5A, in conjunction with FIGS. 1-2, in step 501, relying party 102 is configured to contain a list of OpenID providers 103 trusted by relying party 102 that are to be associated with a particular username. In one embodiment, the list of OpenID providers 103 may be stored in memory, such as RAM 206, or on a permanent storage medium, such as disk 208, of relying party 102. In one embodiment, the list of OpenID providers 103 contains an identification for each OpenID provider 103, such as a URL for each OpenID provider 103.

In step 502, relying party 102 receives a login request from OpenID user 101 where the login request includes the username of OpenID user 101.

In step 503, relying party 102 determines which user profile attributes (e.g., home address, home phone number, age) are to be obtained.

In step 504, relying party 102 reads the list of identity providers 103 associated with the received username of OpenID user 101.

In step 505, relying party 102 makes a determination as to whether there are any identity providers 103 from the list that have not previously been selected. After relying party 102 receives the login request and reads the list of identity providers 103 associated with the username of OpenID user 101, relying party 102 may select the first identity provider 103 from the list. As will be discussed further below, if that identity provider 103 cannot provide any of the requested user attributes not previously obtained, then relying party 102 may select the next available identity provider 103 from the list.

If there is an identity provider 103 that has not previously been selected from the list, then, in step 506, relying party 102 identifies an available identity provider 103 associated with the username of OpenID user 101.

In step 507, relying party 102 generates the OpenID identifier using the username and the identification (e.g., URL) of the identified available identity provider 103. For example, if the username of OpenID user 101 was "someuser" and the identification of the identified identity provider 103 was "http://someotherprovider.com," then relying party 102 may generate the OpenID identifier by appending the username with the identification of the identified available identity provider to form "http://someuser.someotherprovider.com." In another example, relying party 102 may use an algorithm to call a function to perform a calculation to generate the OpenID identifier. For instance, if the username of OpenID user 101 was "someuser", the identification of the identified identity provider 103 was "http://www.customidprovider.com?user=", and the algorithm reverses the string name of the username, then the OpenID identifier would be "http://www.customidprovider.com?user=resuemos.". The OpenID identifier may also be in the format of an XRI i-name. In the example of using an XRI i-name, each trusted identity provider 103 in the list of trusted identity providers may be identified with a particular i-name.

In step 508, relying party 102 transmits an authentication request, using the OpenID identifier formed in step 407, to the identified available identity provider 103 to authenticate OpenID user 101. The OpenID identifier in the authentication request identifies identity provider 103 who is requested to authenticate OpenID user 101. The authentication request further includes a request to receive the user profile attributes determined in step 503 that have not previously been obtained. In one embodiment, the additional request to receive the user profile attributes not previously been obtained may be implemented using OpenID Attribute Exchange, which is a service extension for exchanging identity information.

Referring to FIG. 5B, in conjunction with FIGS. 1-2, in step 509, relying party 102 determines whether the identity provider 103 requested to authenticate OpenID user 101 is available and can provide any of the requested user profile attributes not previously obtained. If the requested identity provider 103 is available to authenticate OpenID user 101 and can provide at least one of the requested user profile attributes that have not previously been obtained, then, in step 510, relying party 102 obtains those user profile attributes from identity provider 103 not previously obtained.

In step 511, relying party 102 determines if it received all of the desired user profile attributes. If relying party 102 received all of the desired user profile attributes, then, in step 512, the process in obtaining user profile attributes is complete.

If, however, relying party 102 did not receive all of the desired user profile attributes, or if the identified identity provider 103 is not available to provide at least some of the desired user profile attributes not previously obtained, then, in step 513, a counter is incremented to track the number of attempts in locating one or more trusted identity providers to provide all of the desired user profile attributes.

In step 514, relying party 102 determines whether relying party 102 has reached a maximum number of attempts in locating one or more trusted identity providers 103 to obtain all of the desired user profile attributes. In one embodiment, relying party 102 determines if it reached a maximum number of attempts by determining if the count in the counter exceeds a threshold, which indicates the maximum number of attempts in locating trusted identity providers 103 to obtain all of the desired user profile attributes.

If the maximum number of attempts has been reached, then, in step 515, relying party 102 reports a message indicating that all of the desired user profile attributes (as determined in step 503) could not be obtained.

Returning to FIG. 5A, if, however, the maximum number of attempts has not been reached, then, in step 504, relying party 102 reads the list of identity providers 103 associated with the received username of OpenID user 101. Relying party 102 may then determine, in step 505, if there are other identity providers 103 that have not previously been selected. If there are other identity providers 103 that have not been selected, then relying party 102 repeats the process in steps 506-509 to determine if that identity provider 103 is available and can provide at least some of the desired user attributes not previously received. By having a list of trusted identity providers 103 associated with a username of OpenID user 101, relying party 102 is able to contact other trusted identity providers 103 to attempt to obtain all of the desired user attributes when an identity provider 103 that authenticates OpenID user 101 does not contain all of the desired user profile attributes.

Referring to step 505, if there are no more available identity providers from the list that have not previously been selected, then, in step 515, relying party 102 reports a message indicating that all of the desired user profile attributes (as determined in step 503) could not be obtained.

Method 500 may include other and/or additional steps that, for clarity, are not depicted. Further, method 500 may be executed in a different order presented and that the order presented in the discussion of FIGS. 5A-B is illustrative. Additionally, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for enabling authentication of an OpenID user when a requested identity provider is unavailable, the method comprising:
   receiving a login request from said OpenID user, wherein said login request comprises a username;
   reading a list of identity providers associated with said username;
   identifying a first available identity provider from said list of identity providers;
   generating a first OpenID identifier using an identification of said first identified identity provider and said username;
   transmitting, by a computer processor of a relying party, a request to said first identified identity provider to authenticate said OpenID user using said first OpenID identifier; and
   incrementing a counter when said first identified identity provider was not available.

2. The method as recited in claim 1 further comprising:
   configuring said relying party to contain said list of identity providers associated with said username.

3. The method as recited in claim 1 further comprising:
   completing said OpenID authentication with said first identified identity provider when said first identified identity provider is available.

4. The method as recited in claim 1 further comprising:
   reading said list of identity providers associated with said username to identify a next available identity provider.

5. The method as recited in claim 4 further comprising:
   identifying said next available identity provider;
   generating a second OpenID identifier using an identification of said next identified identity provider and said username; and
   transmitting a request to said next identified identity provider to authenticate said OpenID user using said second OpenID identifier.

6. A computer program product embodied in a computer readable device for enabling authentication of an OpenID user when a requested identity provider is unavailable, the computer program product comprising the programming instructions for:
   receiving a login request from said OpenID user, wherein said login request comprises a username;
   reading a list of identity providers associated with said username;
   identifying a first available identity provider from said list of identity providers;
   generating a first OpenID identifier using an identification of said first identified identity provider and said username;
   transmitting a request to said first identified identity provider to authenticate said OpenID user using said first OpenID identifier; and
   incrementing a counter when said first identified identity provider was not available.

7. The computer program product as recited in claim 6 further comprising the programming instructions for:
   configuring a relying party to contain said list of identity providers associated with said username.

8. The computer program product as recited in claim 6 further comprising the programming instructions for:
   completing said OpenID authentication with said first identified identity provider when said first identified identity provider is available.

9. The computer program product as recited in claim 6 further comprising the programming instructions for:
   reading said list of identity providers associated with said username to identify a next available identity provider.

10. The computer program product as recited in claim 9 further comprising the programming instructions for:
    identifying said next available identity provider;
    generating a second OpenID identifier using an identification of said next identified identity provider and said username; and
    transmitting a request to said next identified identity provider to authenticate said OpenID user using said second OpenID identifier.

* * * * *